US006459386B1

(12) United States Patent
Jones

(10) Patent No.: US 6,459,386 B1

(45) Date of Patent: Oct. 1, 2002

(54) PARKING VIOLATION RECORDING SYSTEM

(76) Inventor: Joseph Jones, 126 E. 95th St., Apt 2F, Brooklyn, NY (US) 11212

(*) Notice: Subject to any disclaimer, the term of this patent is extended or adjusted under 35 U.S.C. 154(b) by 0 days.

(21) Appl. No.: 09/829,323

(22) Filed: Apr. 9, 2001

(51) Int. Cl.[7] .................................................. B60Q 1/48

(52) U.S. Cl. .................... 340/932.2; 340/933; 340/937; 340/148; 340/159

(58) Field of Search ................................ 340/937, 933, 340/932.2, 425.5; 348/148, 159

(56) References Cited

U.S. PATENT DOCUMENTS 5,777,951 A * 7/1998 Mitschele et al. .......... 340/933
5,948,038 A * 9/1999 Daly et al. .................. 701/117
6,081,206 A * 6/2000 Kielland ..................... 340/937

* cited by examiner

*Primary Examiner*—Julie Lieu
(74) *Attorney, Agent, or Firm*—Goldstein & Lavas, P.C.

(57) ABSTRACT

A parking violation recording system, for recording parking violations committed by violating vehicles, using an official vehicle having cameras located along the passenger side and along the driver side near the front and rear of the official vehicle. The operator of the official vehicle positions said vehicle substantially alongside the violating vehicle, and views images from the cameras on a display unit within the official vehicle. Once satisfied with the content of the images, the recording system acquires the images at the operator's request, and creates a data record memorializing the violation. Numerous data records are stored in image memory for later retrieval.

18 Claims, 5 Drawing Sheets

PARKING VIOLATION RECORDING SYSTEM

BACKGROUND OF THE INVENTION

The invention relates to a parking violation recording system. More particularly, the invention relates to a system for quickly recording multiple traffic violations.

The standard practice of issuing parking violations in most urban areas involves the use of officials, commonly known as "meter-maids". They scour the streets in search of a violator. Once a violating vehicle is located, the official must exit their vehicle (if not on foot), record important vehicular information, and write out a written acknowledgment of the violation—commonly known as "a ticket".

One of the main limitations of this process is that considerable time must be spent by the official to write up the violation. This time would be more productively used scouring the streets for another violator. In addition, parking violations officials frequently happen upon a street where numerous vehicles are simultaneously violating. Once the official starts "writing up" one vehicle. The owners of the other vehicles quickly catch on, and exit the scene before a violation can be issued to them.

While these units may be suitable for the particular purpose employed, or for general use, they would not be as suitable for the purposes of the present invention as disclosed hereafter.

SUMMARY OF THE INVENTION

It is an object of the invention to provide a parking violation recording system which allows parking violations to be quickly recorded and issued to violating vehicles. Accordingly, the system photographically records the vehicles identity so that a violation can be issued.

It is another object of the invention to provide a parking violation recording system which allows multiple parking violations to be quickly recorded. Accordingly, the photographic vehicle identification aspect of the present invention requires minimal time, so that another violating vehicle can be quickly identified by the system shortly thereafter.

It is a further object of the invention to immediately notify the vehicle owner that a violation has occurred, and then provide a formal notification thereafter. Accordingly, a receipt sticker is generated, which is placed on the vehicle windshield if time permits, and a formal violation is mailed to the registered owner several days later.

It is a still further object of the invention that the identification of the vehicle also serves as evidence of the violation. Accordingly, the identifying photographs may also show the vehicle illegally parked, and are encoded with time and date information, as well as codes for the type of violation.

The invention is a parking violation recording system, for recording parking violations committed by violating vehicles, using an official vehicle having cameras located along the passenger side and along the driver side near the front and rear of the official vehicle. The operator of the official vehicle positions said vehicle substantially alongside the violating vehicle, and views images from the cameras on a display unit within the official vehicle. Once satisfied with the content of the images, the recording system acquires the images at the operator's request, and creates a data record memorializing the violation. Numerous data records are stored in image memory for later retrieval.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
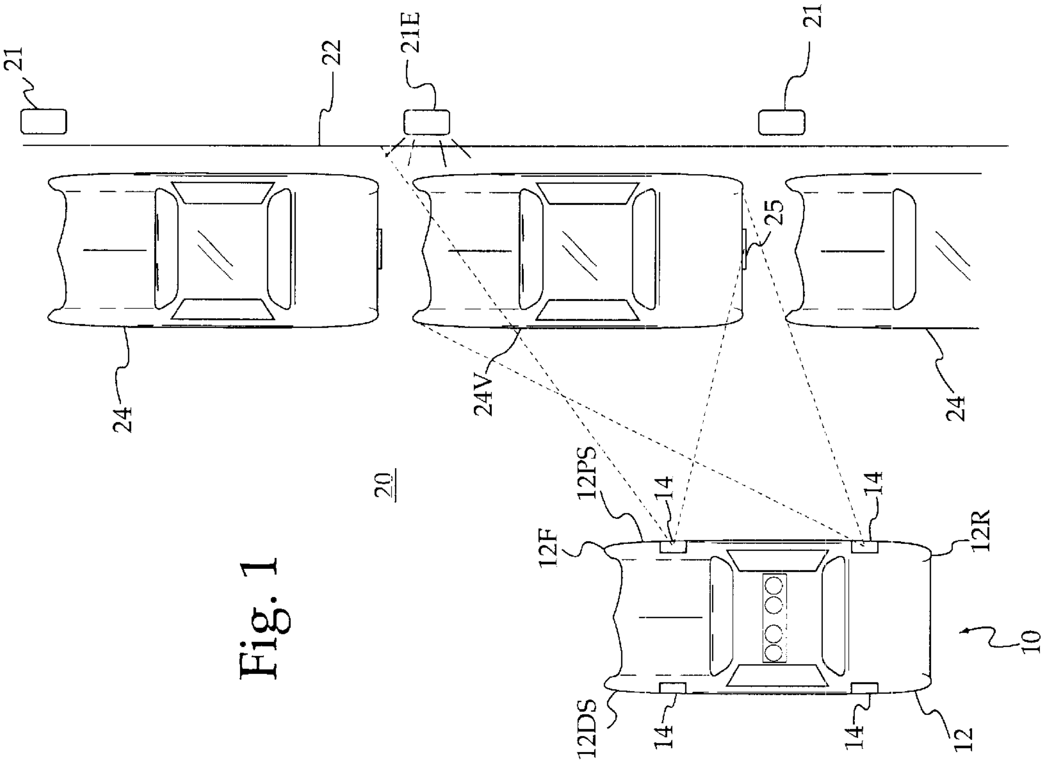
FIG. 1 is a top plan view, illustrating the present invention, installed within an official vehicle, recording photographic images of a violating vehicle

FIG. 1 illustrates a parking violation recording system 10 in use. The recording system 10 is installed in an official vehicle 12, having a front 12F, a rear 12R, a driver side 12DS, and a passenger side 12PS. Cameras 14 are located along the passenger side 12PS and driver side 12DS and are oriented at various angles therefrom.

As illustrated in FIG. 1, the official vehicle 12 is traveling down a street 20 having a curb 22. Parking meters 21 are located along the curb 22. Parked along the curb 22 are civilian vehicles 24, which each have a license plate 25. Included among the civilian vehicles 24 is a violating vehicle 24V which is parked adjacent to an expired parking meter 21E. Advantageously, an operator of the official vehicle 12 spots the violating vehicle 24V and positions said official vehicle 12 so that the violating vehicle 24V and the expired meter 21E is viewable by the cameras 14. The official vehicle 12 is then able to record the violation using images acquired by the cameras 14 to an extent necessary to legally establish the violation and the identity of the violating vehicle.

In the example of FIG. 1, cameras located along the passenger side 12S, near the front 12F and the rear 12R, are used to record the violation. Installing these cameras alone is suitable for recording parking violations on a two-way street. However, on a one way street, the official vehicle 12 would be "blind" to violations occurring on the driver side 12DS. Accordingly, the official vehicle should be provided with cameras 14 on both the driver side 12DS and passenger side 12PS, arranged in selectable camera arrays for selectively recording violations occurring on either side of the official vehicle 12.

Figure 2:
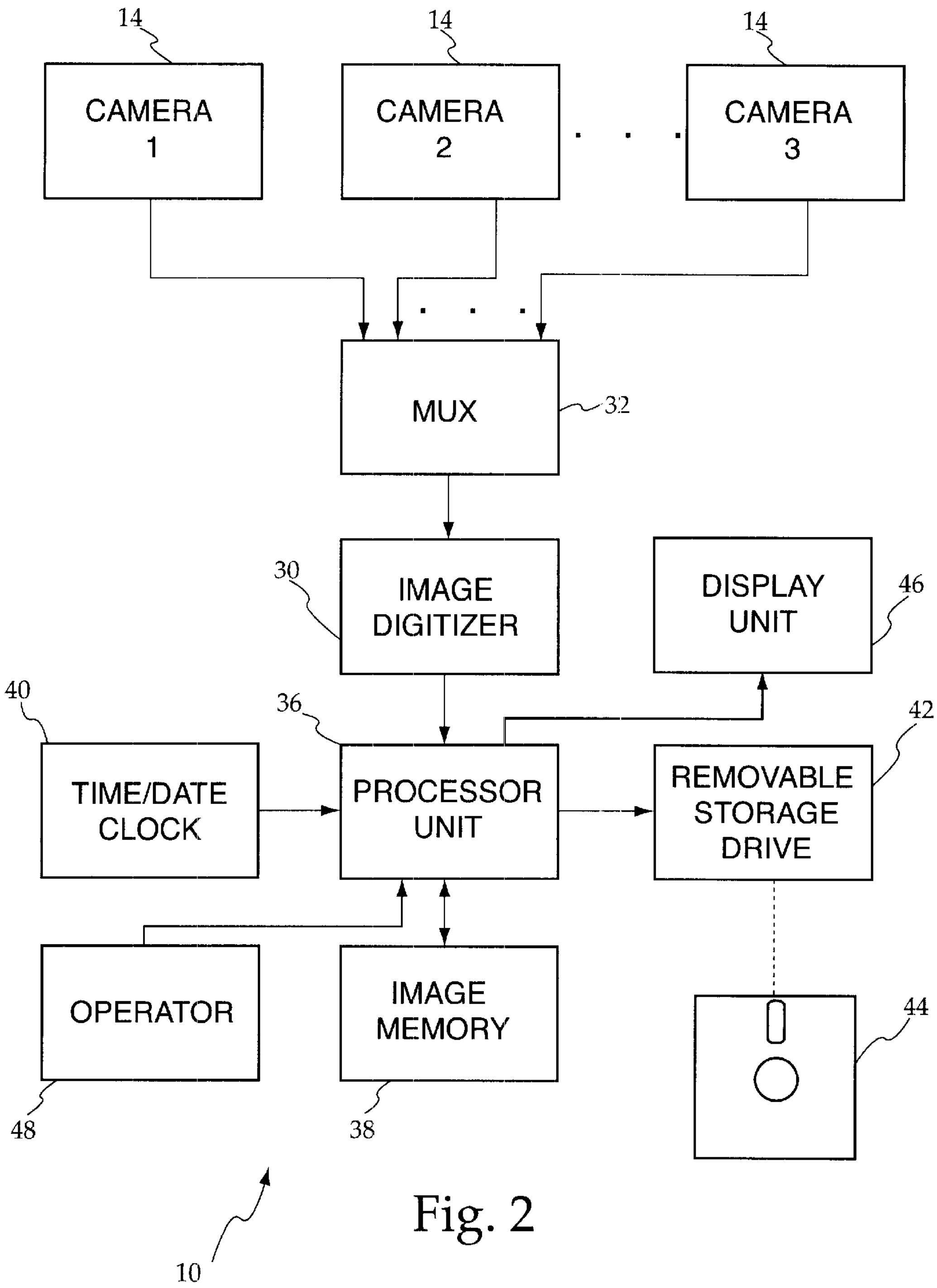
FIG. 2 is a block diagram, illustrating functional interconnection of various components of the present invention.

Referring to FIG. 2, the parking violation recording system 10 includes several cameras 14, which are connected to an image digitizer 30 through a multiplexer 32, which allows selection of a specific output signal from a specific one of the cameras 14, so that said output signal can be digitized.

Data from the image digitizer 30 is transferred to a processor unit 36, which provides overall control and functionality to the various components of the parking violation recording system 10. In particular, the image digitizer 30 is in communication with an image memory unit 38 which is capable of storing numerous data records, which each provide a recordation of a single parking violation or single violating vehicle. A further part of each data record is provided by the time and date clock 40, such that along with the images, a time stamp is created to provide the necessary evidentiary authentication to the images. The data records may be transferred to a removable storage drive 42, which is capable of accepting removable media 44, such as a magnetic disk, magnetic tape cartridge, optical disk, or the like. The data records may be transferred from the image memory 38 to the removable storage drive 42 in plurality at the request of the operator, at a certain pre-set time, or may be transferred individually as the images are acquired.

Figure 3:
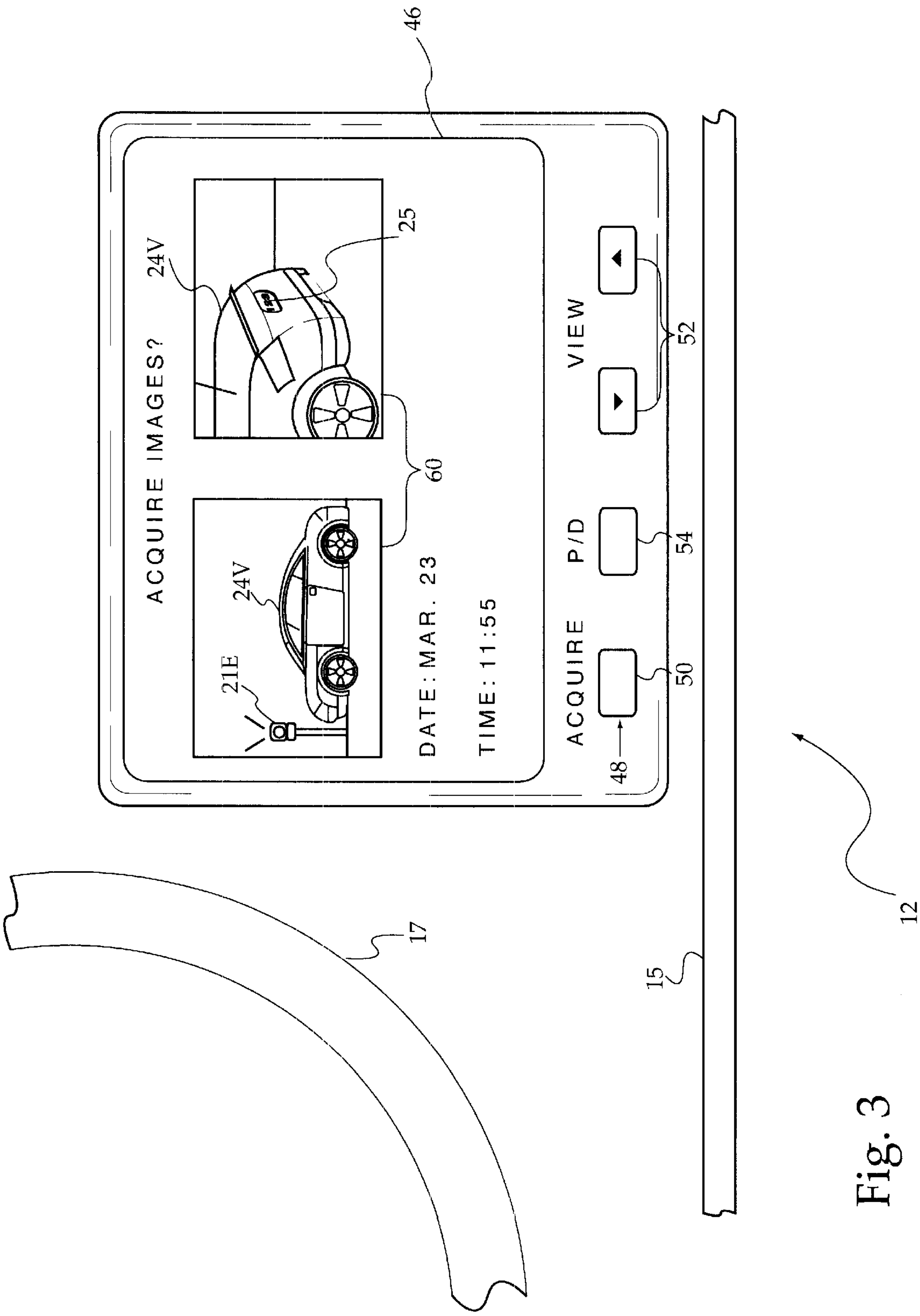
FIG. 3 is a perspective view (front elevational view?) of a portion of the official vehicle dashboard, showing the display unit in use, displaying to the operator prospective images of the violating vehicle.

When acquiring the images, it is helpful for the operator to view the images, to ascertain whether they properly memorialize the violation, and to allow the operator to testify to their content. Accordingly, a display unit 46 is provided. In addition, the operator controls 48 allow, among other things, selection of an appropriate time to acquire images. Reference to FIG. 3 illustrates how the operator chooses to acquire the images when appropriate.

In FIG. 3, the display unit 46 is located within the official vehicle 12, in its interior 15, adjacent to a steering wheel 17. The display unit 46 shows a pair of display images 60 which represent what one or more of the cameras are currently viewing. The operator controls 48 are located immediately adjacent to the display unit 46, including an acquire button 50, view buttons 52, and a passenger/driver select button 54.

When the official vehicle 12 is in the vicinity of the violating vehicle, the operator views the display unit 46 to determine whether the violating vehicle is properly within the view of the cameras 14. Referring momentarily to both FIG. 1 and FIG. 3, advantageously when the official vehicle 12 is nearly alongside the violating vehicle, cameras 14 near the front 12F and rear 12R provide the display images 60 viewed on the display unit 46. Depending on which side of the street the violating vehicle is located, the user may press the passenger/driver select button 54 to select cameras on the passenger side 12PS or driver side 12DS of the official vehicle 12.

In the case of the violation indicated in FIG. 1, the official vehicle 12 is positioned alongside and just rearward of the violating vehicle 24V. One of the cameras 14, located near the front 12F of the official vehicle 12, has the side of the vehicle in full view, and is also able to record the violation, by viewing the expired parking meter 21E. As seen in FIG. 3, this image is shown to the operator as one of the display images 60. In addition, another one of the cameras 14, located near the rear 12R of the official vehicle 12, has the rear and side of the violating vehicle 24V in view, and most importantly has the license plate 25 of the violating vehicle 24V in full view. This image is also shown to the operator as one of the display images. The operator is prompted "ACQUIRE IMAGES?" on the display unit 46. If the operator is satisfied that the display images 60 adequately record the violation, the operator may press the acquire button 50, causing the display images 60 to be digitized and stored along with the date and time as a data record. If the operator is not satisfied that the display images 60 adequately record the violation, the operator may reposition the official vehicle 12 until the display images are satisfactory, or may use other means which may be provided to either select alternate cameras or reposition the cameras themselves. The view buttons 62 may be used to scan through the data records previously recorded into the image memory.

Figure 4:
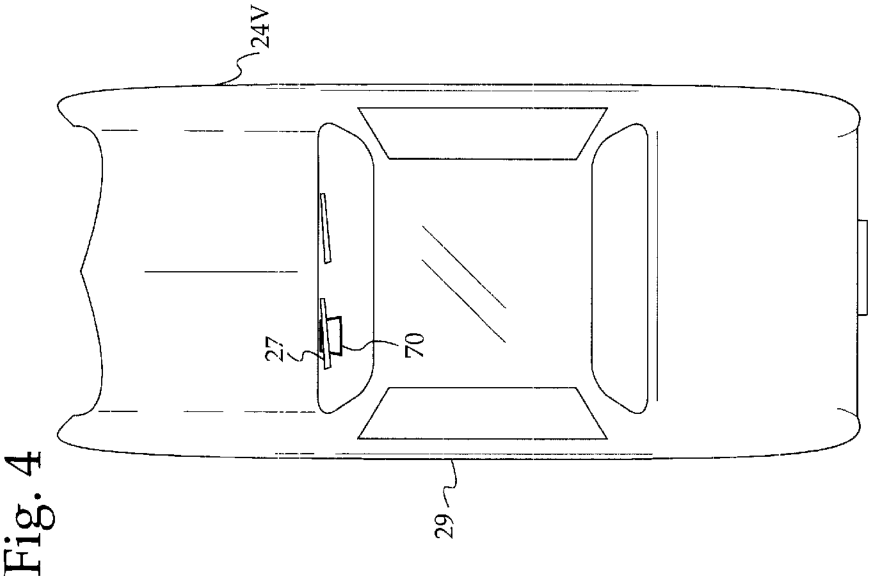
FIG. 4 is a top plan view of a violating vehicle, wherein a notification card has been placed in the windshield of the violating vehicle.

Referring to FIG. 4, once the violation has been successfully recorded, the operator leaves a notification sticker 70 on the violating vehicle 24V. The notification sticker 70 may be left under a windshield wiper 27 of the violating vehicle 24V as shown, or may be adhered to a window 29 of the violating vehicle. The notification sticker 70 preferably contains indicia which informs the driver of the violation, and may be numbered for referencing purposes, either by law enforcement personnel, or possibly even by the civilian owner of the violating vehicle 24V.

Figure 6:
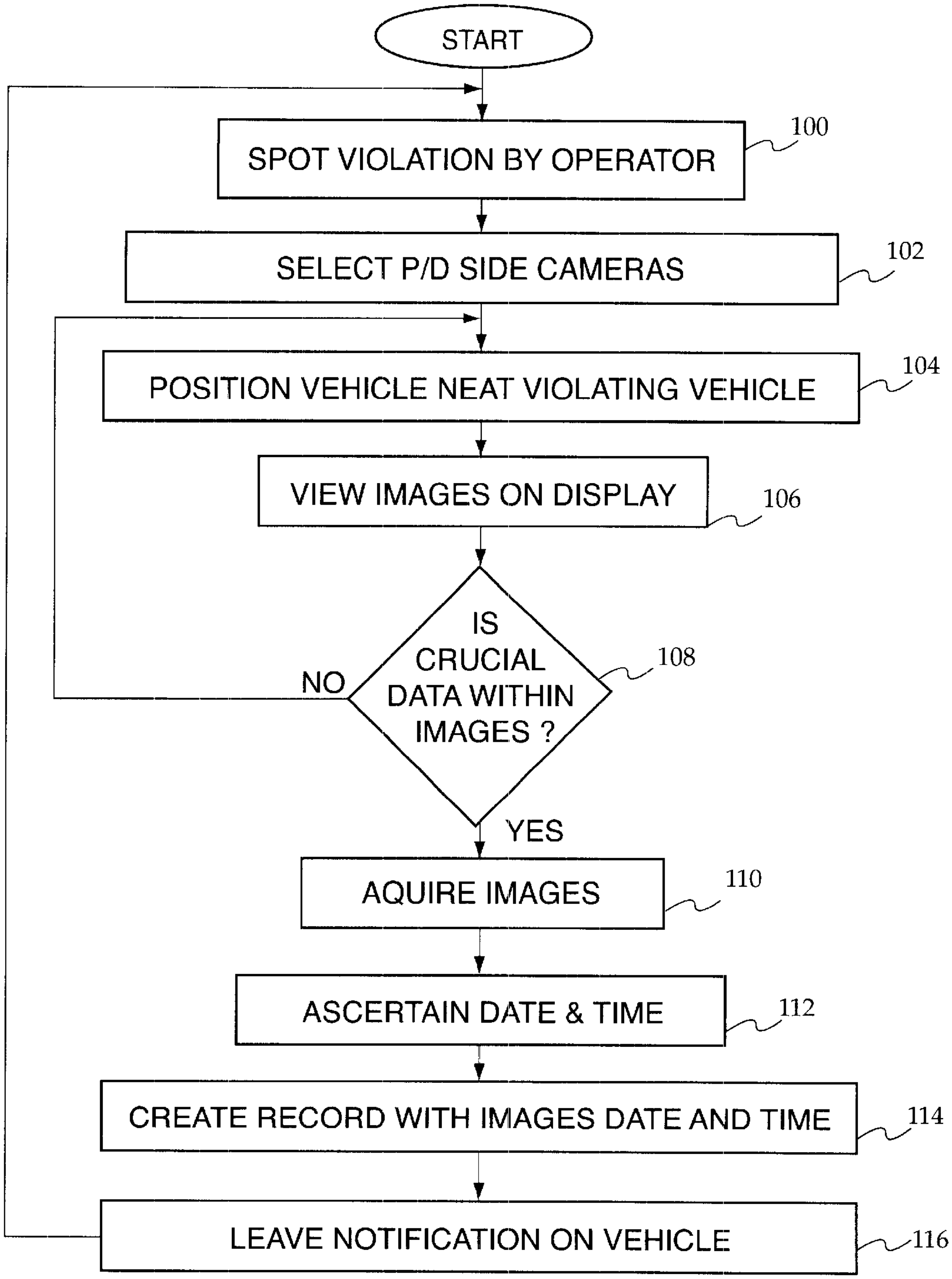
FIG. 6 is a flow diagram, illustrating major steps taken in practicing the present invention.

To summarize the process by which parking violations are recorded according to the present invention, refer to FIG. 6. Initially the operator patrols the streets in the official vehicle, until the operator spots a parking violation 100. Then, depending on the side of the street the violating vehicle is located, the user selects passenger or driver side cameras 102. Then the operator positions the official vehicle near the violating vehicle 104, and views the display images on the display unit 106. Upon viewing the display images, the operator must decide whether crucial data is contained within the display images 108—in other words, is the violation adequately recorded with the display images 108. If not, then the operator once again returns to the step of positioning the official vehicle near the violating vehicle 104 and viewing the display image on the display unit 106, which may be repeated until the operator is satisfied with the display images as viewed on the display unit. When the operator does determine that the crucial data is contained with the display images, the operator chooses to acquire the images 110 by pressing the acquire button among the operator controls, which initiates image acquisition which includes digitization of the images. The current date and time are ascertained 112, and a data record is created with both the images, and date and time 114. Of course locational data may also be encoded with the data record using GPS or other location technology. The operator would then leave notification on the violating vehicle 116. After the violation has been recorded and the operator notified, the operator can immediately return to patrolling the streets for another violating vehicle, until a violation is once again spotted by the operator 100.

Figure 5:
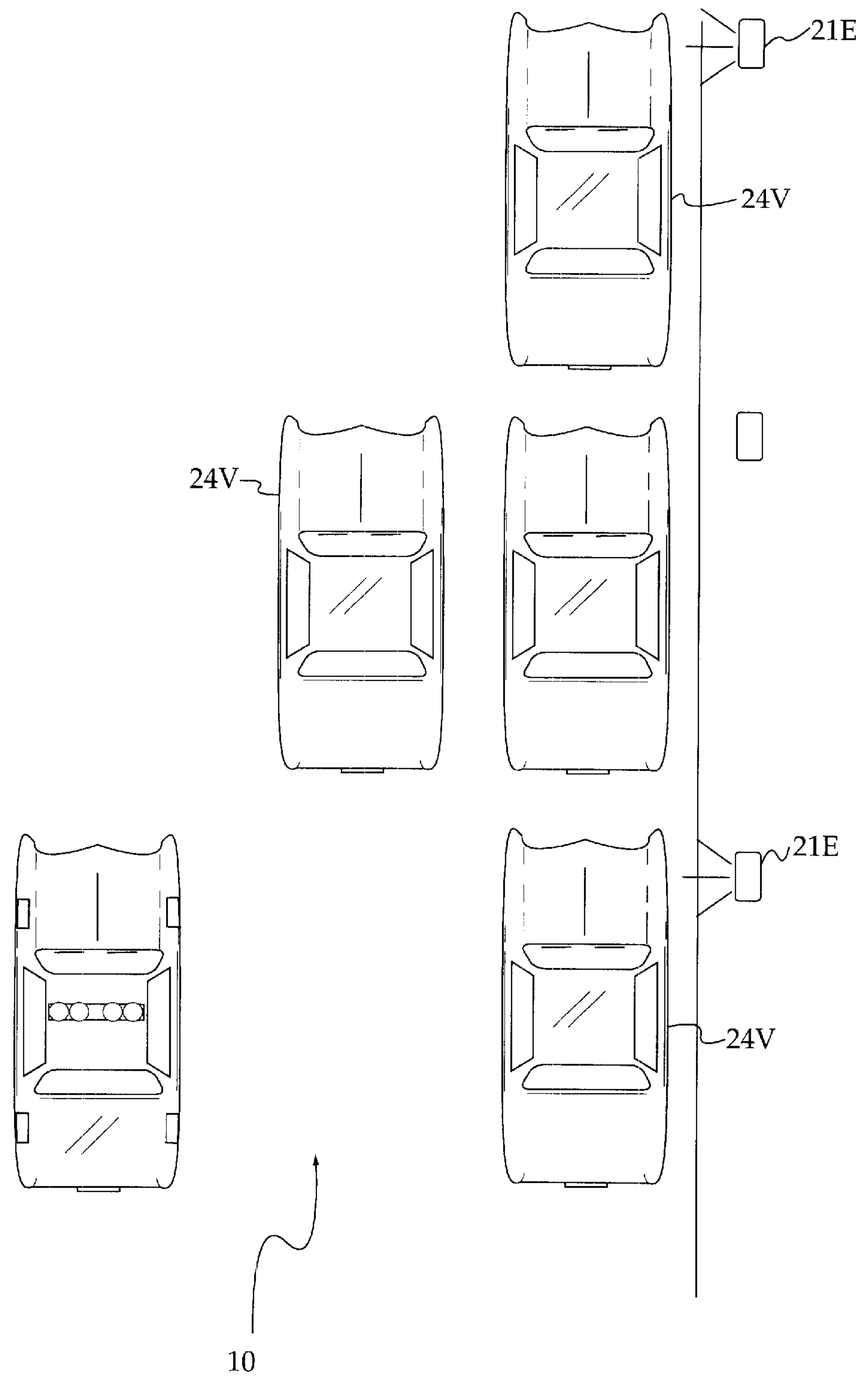
FIG. 5 is a top plan view, illustrating how the present invention may be used to record multiple violating vehicles in rapid succession.

Referring to FIG. 5, the parking violation recording system 10 of the present invention is most useful when multiple violations are spotted in the same locale. In FIG. 5, several violating vehicles 24V are present on the same street 20, including two violating vehicles 24V parked next to expired parking meters 21E, and one "double-parked" vehicle. Using the present invention, all three violations can be recorded within a very short amount of time—before any of the vehicle owners can "catch on" and move their vehicle. In a slight deviation from the ordered steps in FIG. 6, the operator may choose to record all three parking violations before leaving notification on the vehicles. Then, the operator may exit the official vehicle 12 and place notifications on the windshields of each of the vehicles.

In conclusion, herein is presented a parking violation recording system which allows an official vehicle to immediately record parking violations when spotted, to increase the efficiency with which parking violations are recorded and the volume which they may be recorded by the official vehicle. The invention is illustrated by example in the drawing figures and the accompanying description. However, such examples are illustrative only. Numerous variations are possible while adhering to the inventive principles. Such variations are contemplated as being a part of the present invention.

What is claimed is:

1. A parking violation recording system, for recording parking violations by violating vehicles, each having a side and a rear, a license plate at the rear, by an operator and an official vehicle having a front, a rear, a passenger side, and a driver side, comprising:

at least two cameras located along the passenger side of the vehicle the official vehicle, one of said cameras located near the front and the other of said cameras located near the rear of the official vehicle, the cameras] oriented so that it is capable of viewing the violating vehicle when positioned substantially alongside the official vehicle;

a display device for displaying a display image which represents what is visible to the at least one camera, the display device mounted within the official vehicle so that it is viewable by the operator; and a means for acquiring and storing still images from the at least two cameras at the request of the operator to create a data record containing a visual recordation of the side and rear of the violating vehicle and the violation.

2. The parking violation recording system as recited in claim 1, wherein said cameras oriented for obtaining images of the violating vehicle located along the passenger side of said official vehicle.

3. The parking violation recording system as recited in claim 2, wherein the at least two cameras further comprises two additional cameras located along the driver side of the vehicle, and wherein the recording system further comprises a selection means for selecting between the cameras on the driver side and on the passenger side, for selectively recording the violating vehicle when located on the driver side and the passenger side of the official vehicle.

4. The parking violation recording system as recited in claim 3, further comprising a date and time clock, wherein date and time information is recorded in the data record.

5. The parking violation recording system as recited in claim 4, further comprising image memory for storing multiple data records, wherein each data record includes images and time and date information of one violating vehicle.

6. A parking violation recordation system, for recording parking violations by violating vehicles, each having a side, and a rear having a license plate, by an operator and an official vehicle having a front, a rear, a passenger side, and a driver side, comprising the steps of:

locating a violating vehicle by-the operator;

positioning the official vehicle substantially alongside the violating vehicle; and acquiring two images of the violating vehicle sufficient to ascertain the identify of the vehicle and show that the vehicle is committing a violation by:

acquiring an image of the violating vehicle from its side, and acquiring an image of the violating vehicle from its rear which shows the license plate of said violating vehicle.

7. The parking violation recording system as recited in claim 6, wherein the official vehicle has at least two cameras, one camera located near the front of the official vehicle, the other camera located near the rear of the official vehicle.

8. The parking violation recording system as recited in claim 7, wherein the official vehicle has two cameras located on the passenger side and two cameras located on the driver side, and wherein the step of acquiring a pair of images of the violating vehicle is preceded by selecting by the operator the use of the cameras on the passenger side or the cameras on the driver side.

9. The parking violation recording system as recited in claim 8, wherein a display unit is located inside the official vehicle for displaying display images from the selected cameras, and wherein the step of acquiring a pair of images of the violating vehicle is preceded by the step of viewing the display images by the operator to determine if the display images properly record the violating vehicle.

10. The parking violation recording system as recited in claim 9, wherein the step of acquiring the images is preceded by the operator ascertaining whether the display images properly record the violating vehicle, and then if they do not properly record the violating vehicle, the method further includes the step of repositioning the official vehicle until the display images properly depict the violating vehicle.

11. The parking violation recording system as recited in claim 9, wherein the steps as recited is followed by the step of leaving a notification sticker on the violating vehicle.

12. The parking violation recording system as recited in claim 11, wherein the steps as recited are repeated for multiple violating vehicles, wherein a data record is created for each violating vehicle, further using a removable storage device, and further comprising the step of transferring the data records to the removable storage device.

13. The parking violation recording system as recited in claim 12, wherein view buttons are located adjacent to the display screen, and wherein the operator views the data records by operating the view buttons.

14. A parking violation recording system, for recording parking violations by violating vehicles, each having a license plate, by an operator and an official vehicle having a front, a rear, a passenger side, and a driver side, the official vehicle further having at least one camera and a display unit, comprising the steps of:

a) spotting a violating vehicle committing a traffic violation by the operator;

b) positioning the official vehicle near the violating vehicle to orient the at least one camera toward the violating vehicle;

c) viewing display images representing prospective images of the official vehicle on the display unit by the operator;

d) ascertaining whether the display images adequately show the traffic violation and the vehicle identification, if they do not, then repeating steps (b) and (c);

e) acquiring the display images when requested by the operator; and f) creating a data record with the images.

15. The parking violation recording system as recited in claim 14, using at least two cameras, one of said cameras located near the official vehicle front, the other of said cameras located near the official vehicle rear, and wherein the step of acquiring the images further comprises acquiring an image of the violating vehicle from its side with the camera located near the official vehicle front, and acquiring an image of the violating vehicle from its side and rear wherein said image shows the license plate of the violating vehicle.

16. The parking violation recording system as recited in claim 15, wherein the cameras previously recited are located along the passenger side of the official vehicle, wherein the official vehicle has two additional cameras located along the driver side, and wherein the step of acquiring the images is preceded by the step of selecting the passenger or driver side cameras by the operator.

17. The parking violation recording system as recited iin claim 16, wherein the steps as recited are followed by the step of leaving a notification sticker on the violating vehicle.

18. The parking violation recording system as recited in claim 17, wherein the official vehicle has image memory and a removable storage drive, and further comprising the step of storing the data records in the image memory, and transferring the data records from image memory to the removable storage drive.

* * * * *